US011197479B2

(12) United States Patent
Quaghebeur

(10) Patent No.: US 11,197,479 B2
(45) Date of Patent: Dec. 14, 2021

(54) USE OF SILTHIOFAM FOR THE TREATMENT OF SOYBEAN RUST

(71) Applicant: Globachem NV, Sint-Truiden (BE)

(72) Inventor: Koen Quaghebeur, Sint-Truiden (BE)

(73) Assignee: Globachem NV, Sint-Truiden (BE)

( * ) Notice: Subject to any disclaimer, the term of this patent is extended or adjusted under 35 U.S.C. 154(b) by 0 days.

(21) Appl. No.: 16/549,134

(22) Filed: Aug. 23, 2019

(65) Prior Publication Data

US 2020/0060279 A1 Feb. 27, 2020

(30) Foreign Application Priority Data

Aug. 23, 2018 (BE) .................................. 2018/5584

(51) Int. Cl.

*A01N 55/00* (2006.01)
*A01N 35/02* (2006.01)
*A01N 43/16* (2006.01)

(52) U.S. Cl.

CPC ............ *A01N 55/00* (2013.01); *A01N 35/02* (2013.01); *A01N 43/16* (2013.01)

(58) Field of Classification Search

CPC ......... A01N 55/00; A01N 35/02; A01N 43/16
USPC ........................................................... 514/55
See application file for complete search history.

(56) References Cited

U.S. PATENT DOCUMENTS

| | | | |
|---|---|---|---|
| 2005/0032903 A1 | 2/2005 | Suarez-Cervieri et al. | |
| 2007/0010401 A1 | 1/2007 | Noon | |
| 2008/0039481 A1 | 2/2008 | Kemper | |
| 2008/0064601 A1* | 3/2008 | Casanello ............ | A01N 43/653 504/272 |
| 2008/0287299 A1 | 11/2008 | Martins Dos Santos | |
| 2009/0104311 A1 | 4/2009 | Ouriev | |
| 2010/0099559 A1 | 4/2010 | Dietz | |
| 2011/0092466 A1 | 4/2011 | Groeger | |
| 2011/0312493 A1 | 12/2011 | Oostendorp | |
| 2015/0296777 A1* | 10/2015 | Tronsmo ................ | A01N 43/54 514/55 |

FOREIGN PATENT DOCUMENTS

| | | | |
|---|---|---|---|
| EP | 3047731 | A1 | 7/2016 |
| WO | 9618631 | A1 | 6/1996 |
| WO | 02051246 | A1 | 7/2002 |
| WO | 2005041669 | A1 | 5/2005 |
| WO | 2005122771 | A1 | 12/2005 |
| WO | 2006024521 | A1 | 3/2006 |
| WO | 2006066810 | A2 | 6/2006 |
| WO | 2006102657 | A2 | 9/2006 |
| WO | 2007068420 | A1 | 6/2007 |
| WO | 2013127859 | A1 | 9/2013 |

OTHER PUBLICATIONS

Wikipedia; 'Soybean Rust'; https://en.wikipedia.org/wiki/Soybean_rust#cite_note-InvasiveSpecies.gov-1; Jul. 1, 2021.*

Enz et al., "Compendium of Growth Stage Identification Keys for Mono—and Dicotyledonous Plants," Extended BBCH scale, 2nd Edition 1997, ISBN 3-9520749-3-4.

Uwe Meier, "Growth Stages of Mono-and Dicotyledonous Plants," Extended by BBCH Monograph, Quedlinburg 2018, ISBN 978-3-95547-071-5.

* cited by examiner

*Primary Examiner* — Shaojia A Jiang
*Assistant Examiner* — Michael C Henry
(74) *Attorney, Agent, or Firm* — Dinsmore & Shohl LLP

(57) ABSTRACT

The present invention relates to the use of silthiofam for the treatment of soybean rust and agricultural compositions thereof. The invention further relates to a method of controlling, preventing and/or treating of phytopathogenic fungi causing soybean rust.

9 Claims, No Drawings

USE OF SILTHIOFAM FOR THE TREATMENT OF SOYBEAN RUST

CROSS-REFERENCE TO RELATED APPLICATIONS

This application claims priority to Belgian Patent Office Application No. BE2018/5584, filed on Aug. 23, 2018, the contents of which are hereby incorporated by reference in their entirety.

TECHNICAL FIELD

The present invention relates to the use of silthiofam for the treatment of soybean rust and agricultural compositions thereof. The invention further relates to a method of controlling, preventing and/or treating of phytopathogenic fungi causing soybean rust.

BACKGROUND

Soybean is one of the most important commercial crops worldwide, however, yield and quality is heavily affected by soybean rust disease which occurs in most of the major soybean-growing regions.

Soybean rust, incited by *Phakopsora pachyrhizi* and *P. meibomiae* fungi, is the most destructive foliar disease of soybean, and yield losses of over 50% are common when environmental conditions are favorable, and the disease is not adequately treated.

Early soybean rust symptoms are most commonly observed on the leaves in the lower canopy, but due to the rapid spread of disease and deterioration of the leaf tissue, resulting in drying and premature defoliation, photosynthesizing ability of the plant is reduced and the formation of the full grain is precluded, which consequently results in reduction of seed number per pod, decreased seed size and decreased number of filled pods per plant.

The earlier the defoliation occurs, the greater is the yield loss.

To prevent the disease from developing, fungicides need to be applied upon early infection and should protect the entire canopy of the plant. The number of fungal applications needed is dependent upon how early in the season the disease is caught and the weather conditions in the region.

Soybean rust usually requires, depending on the severity of the disease, two to four applications. However, the fungicide treatments can increase from four to eight applications in regions having more than one soybean season in one year.

Due to such frequent use of fungicides with same or similar mode of action or rotating use of fungicides with only two to three different modes of action, there is also a serious threat of developing fungicidal resistance of *Phakopsora pachyrhizi.*

Current market-available, soybean rust treatments include foliar treatment with fungicides such as strobilurins such as azoxystrobin, trifloxystrobin, pyraclostrobin, picoxystrobin pyrazole-carboxamides such as fluxapyroxad, benzovindiflupyr, bixafen, triazoles, for example tebuconazole, propiconazole, tetraconazole, myclobutanil; chlorothalonil, mancozeb or copper compounds, as well as commercial formulations in the form of mixtures, such as azoxystrobin and tetraconazole, azoxystrobin and tebuconazole, azoxystrobin and propiconazole, pyraclostrobin and fluxapyroxad, propiconazole and trifloxystrobin, tebuconazole and fluoxastrobin, etc.

Further soybean rust treatments are disclosed in the following documents:

US 2005/032903 discloses use of strobilurin formulations for controlling rust in legumes.

US 2007/010401 discloses combinations of triazole fungicide and glyphosate herbicide for controlling rust disease in soybean.

US 2008/287299 discloses use of fluconazole against *Phakopsora pachyrhizi.*

US 2008/039481 discloses treatment of soybean seeds with various fungicides against soybean rust.

US 2009/104311 discloses use of certain carboxamides for controlling soybean rust.

US 2010/099559 discloses combination of active ingredients against *P. pachyrhizi.*

US 2011/092466 relates to compositions comprising at least one carboxamide and at least one further compound selected from strobilurins and triazoles for controlling rust fungi.

US 2011/312493 describes treatment of soybean rust by applying different pesticidal compositions.

WO 02/051246 discloses a method of improving the yield and vigor of plants such as soybean, by treating the plants and/or its propagation material with a composition that includes an active agent, such as a fungicide, that has no significant activity against fungal plant pathogens of the treated plant. When the plant is not wheat, a preferred agent is silthiofam.

WO 2005/041669 relates to reducing disease caused by *P. pachyrhizi* by treatment with glyphosate.

WO 2005/122771 discloses use of various fungicides for combating rust on soya.

In WO 2006/024521 use of fluquinconazole for treatment of soybean rust.

WO 2006/066810 describes use of orysastrobin and mixtures thereof for controlling rust.

WO 2006/102657 discloses use of flutriafol for protection of soybean against rust.

WO 2007/068420 relates to a method of controlling *P. pachyrhizi* by applying to the soybean plants a combination of cyproconazole and difenoconazole.

WO 2013/127859 discloses composition comprising at least one herbicide A and at least one fungicide B for controlling pathogenic fungi in soybeans.

EP 3047731 discloses use of (2E)-2-[3-substituted-2-[[(E)-[(2E)-2-alkoxyimino-1-methyl-2-phenylethylidene]amino]oxymethyl]phenyl]-2-methoxyimino-N-methyl-acetamides for combating soybean rust.

Additional soybean rust disease control options are very limited. Practices such as planting date, row spacing and crop rotation sequences have no or little effect and, to this day, resistant soybean cultivars do not exist.

To make things even worse, *P. pachyrhizi* has a broad host range and can infect and sporulate other legumes including beans, kudzu, pea and many more.

Therefore, to effectively prevent, control and/or treat soybean rust, effective fungicides are, and will be, of the utmost importance.

It is therefore one of the objects of the present invention to provide an effective treatment of the soybean rust, and surprisingly it was found that silthiofam has high activity against soybean rust causing fungi.

Silthiofam (IUPAC: N-allyl-4,5-dimethyl-2-(trimethylsilyl)thiophene-3-carboxamide) is a fungicide showing a high level of specificity against soil-borne fungal plant pathogen *Gaeumannomyces graminis* causing "Take-all" disease in cereal crops and grasses, wherein its primary mode of action is inhibition of transport of the adenine nucleotide ATP from within mitochondria to the cytosol, resulting in all energy-dependent metabolic processes outside mitochondria disruption and leading to cell death.

Currently, silthiofam is available on the market as a seed treatment for the reduction of "Take-all" disease in winter and spring cereals.

FIG. 1

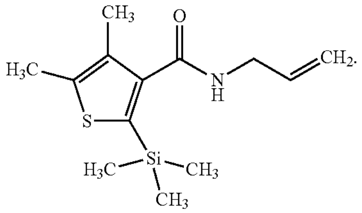

Silthiofam

WO 96/18631 discloses use of silthiofam for the treatment of "Take-all" fungal disease.

SUMMARY

The present invention is based on the surprising finding that silthiofam exhibits high activity against soybean rust causing fungi, *Phakopsora pachyrhizi* and *P. meibomiae* and can be used to prevent, control and/or to treat soybean rust disease.

Silthiofam, according to the present invention can be used alone or in combinations with other ingredients, such as chitosan and tagatose.

Furthermore, silthiofam can be used in combination with one or more compounds selected from the group of:

a) benzimidazole compounds
b) carboxamide compounds
c) copper compounds
d) dithiocarbamate compounds
e) organochlorine compounds
f) pyrimidine compounds
g) pyrrole compounds
h) strobilurin compounds
i) triazole compounds The present invention further relates to a method for controlling, preventing and/or treating phytopathogenic fungi causing soybean rust wherein the method comprises treating the plants, the seeds or the soil by spraying or dusting with a fungicidally effective amount of silthiofam.

According to the invention, phytopathogenic fungi is selected from *Phakopsora pachyrhizi* and *P. meibomiae.*

In one aspect, plant is a legume plant. Furthermore, legume plant is selected from soybean, bean, kudzu and pea.

According to the present invention, silthiofam is applied in an amount from 10 g/ha to 2000 g/ha, 100 g/ha to 1000 g/ha, 100 g/ha to 500 g/ha.

Furthermore, silthiofam is applied in amount of 125 g/ha, 250 g/ha and/or 500 g/ha.

Chitosan, tagatose and/or other compounds can be applied simultaneously with silthiofam, for example in the form of a mixture, before silthiofam or after silthiofam on the plant.

According to one aspect of the present invention, chitosan is applied in amount from about 10-500 g/ha.

According to a second aspect, tagatose is applied in an amount from about 10-500 g/ha.

In a further aspect of the present invention, controlling, preventing and/or treating the plant is performed prior to planting as a seed treatment, after the planting and prior to detection of disease symptoms and/or after the infection occurs.

In a further aspect, silthiofam is applied as a foliar treatment.

DETAILED DESCRIPTION

Provided herein are compositions comprising silthiofam in an agriculturally effective amount to control, prevent and/or treat soybean rust.

The compositions of the present invention can be formulated into any customary type of agrochemical compositions, e. g. solutions, emulsions, suspensions, dusts, powders, pastes, granules, pressings, capsules, and mixtures thereof. Composition types examples are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP), pressings (e.g. BR, TB), granules (e.g. WG, SG, GR), etc.

In one aspect of the present invention, silthiofam compositions comprise one or more agrochemically acceptable auxiliaries.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Compositions according to the present invention can further comprise chitosan and/or tagatose.

Compositions according to the present invention comprise chitosan and/or tagatose in amount from about 10-500 g/L.

Furthermore, provided herein are methods for controlling, preventing or treating phytopathogenic fungi causing soybean rust wherein the method comprises applying silthiofam, alone or in combination with other ingredients, to the legume plant species.

One or more ingredients applied with silthiofam are selected from the group comprising chitosan, tagatose, other compounds as defined herein and mixtures thereof.

According to the present invention, chitosan is a chitooligosaccharide, wherein said chitooligosaccharide comprises β-(1-4)-linked D-glucosamine and N-acetyl-Dglucosamine monomers and have a degree of acetylation between 0.01 and 0.40 and an average degree of polymerization of 20-60 as assessed by measurement with $^{1}H$ NMR spectroscopy.

One or more compounds which can be used in combination treatment simultaneously, prior or post treatment with silthiofam are selected from:

a) acylalanine compounds,
b) antibiotics,
c) benzimidazole compounds,
d) benzoyl compounds,
e) carbamate compounds,
f) carboxamide compounds,
g) copper compounds,
h) dicarboximide compounds,
i) dithiocarbamate compounds,
j) ethylenediamine compounds,
k) guanidine compounds,
l) imidazole compounds,
m) isoxazolidine compounds, n) morpholine compounds,
o) organochlorine compounds,
p) organophosphorus compounds,
q) picolinamide,
r) pyrimidine compounds,
s) pyrrole compounds,
t) quinoline compounds,
u) strobilurin compounds,
v) sulfonamide compounds,
w) sulfonamide compounds,
x) thiazolidine compounds,
y) triazole compounds,
z) triazolopyrimidine compounds,
aa) valinamide compounds.

Furthermore, the following compounds are meant to be included:

a) Acylalanine:

benalaxyl, benalaxyl-M, furalaxyl-M, metalaxyl, metalaxyl-M b) Antibiotics:

blasticidin-S-benzylaminobenzenesul-fonate, kasugamycin, mildiomycin, natamycin, oxytetracycline, polyoxin derivatives, streptomycin, validamycin c) Benzimidazoles:

benomyl, carbendazim, fuberidazole, thiabendazole, thiophanate, thiophanate-methyl d) Benzoyl compounds:

3-(2,3,4-trimethoxy-6-methylbenzoyl)-5-chloro-2-methoxy-4-methylpyridine, metrafenone e) Carbamates:

diethofencarb, propamocarb, propamocarb hydrochloride, pyribencarb f) Carboxamide:

bixafen, boscalid, carboxin, carpropamid, cyflufenamid, diclocymet, ethaboxam, fenhexamid, fenoxanil, flumetover, fluopicolide, fluopyram, flutolanil, furametpyr, isopyrazam, isotianil, mandipropamid, mepronil, oxycarboxin, penflufen, penthiopyrad, picobenzamide, sedaxane, tecloftalam, thifluzamide, tiadinil, tolfenpyrad, zoxamide g) Copper compounds:

basic copper chloride, basic copper sulfate, copper, copper (nonylphenyl) sulphonate, cupric hydroxide, cupric sulphate pentahydrate, cupric sulphate(anhydrous), DBEDC, dodecylbenzenesulphonic acid bisethylenediamine copper(II) complex, oxine copper h) Dicarboximides:

captan, chlozolinate, folpet, iprodione, procymidone, vinclozolin i) Dithiocarbamates:

mancozeb, maneb, manzeb, metiram, polycarbamate, propineb, thiuram, zineb, ziram j) Ethylenediamine compounds:

2,2,2-trifluoroethyl((1S)-1-{[(1-benzofurane-2-ylcarbonyl) amino]methyl}-2-methylpropyl) carbamate, 2,2,2-trifluoroethyl((1S)-2,2-dimethyl-1-{[(4-methylbenzoyl)amino]methyl}propyl) carbamate, 2,2,2-trifluoroethyl((1S)-2-methyl-1-{[(4-methylbenzoyl) amino]methyl}propyl)carbamate, 2,2,2-trifluoroethyl{(1S)-1-methyl-2-1 (4-methylbenzoyl) amino]ethyl}carbamate, benzoyl((S)-2-methyl-1-{[(4-methylbenzoyl)amino] methyl}propyl)carbamate, isopropyl((1R)-2,2,2-trifluoro-1-{[(4-methylbenzoyl) amino]methyl}ethyl)carbamate, isopropyl((1S)-1-([(1-benzofuran-2-ylcarbonyl)amino] methyl)-2-methylpropyl)carbamate, isopropyl((1S)-2,2-dimethyl-1-{[(4-methylbenzoyl)amino] methyl}propyl)carbamate, isopropyl((1S)-2-methyl-1-{[(4-methylbenzoyl)amino] methyl}propyl)carbamate k) Guanine compounds:

dodine, guazatine, iminoctadine acetate, iminoctadine albesilate l) Imidazoles:

bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimefon, triadimenol, triticonazole m) Isoxazolidine 3-[2,3-dimethyl-5-(4-methylphenyl)isoxazolidin-3-yl]pyridine, 3-[5-(4-chlorophenyl)-2,3-dimethyl isoxazolidin-3-yl]pyri dine n) Morpholine:

dimethomorph, dodemorph, fenpropimorph, flumorph, tridemorph o) Organochlorine:

chlorothalonil, fthalide, quintozene p) Organophosphorous:

edifenphos, fosethyl and phosphite derivatives, iprobenfos, pyrazophos, tolclophos-methyl q) Picolinamide:

fenpicoxamid r) Pyrimidine:

bupirimate, cyprodinil, diflumetorim, dimethirimol, fenarimol, ferimzone, mepanipyrim, nuarimol, pyrimethanil s) Pyrrole compounds:

fenpiclonil, fludioxonil, fluoroimide t) Quinoline compounds:

[6-(2,2-dimethylethyl)-8-fluoro-2,3-dimethylquinoline-4-yl]acetate,

[6-(2,2-dimethylethyl)-8-fluoro-2,3-dimethylquinoline-4-yl]methoxyacetate, quinoxyfen u) Strobilurins:

azoxystrobin, dimoxystrobin, fluoxastrobin, kresoxim-methyl, metominostrobin, orysastrobin, picoxystrobin, pyraclostrobin, pyrametostrobin, pyraoxystrobin, trifloxystrobin v) Sulfenamide compounds:

dichlofluanid, tolylfluanid w) Sulfonamide compounds:

amisulbrom, cyazofamid, flusulfamide x) Thiazolidine compounds:

flutianil y) Triazole compounds:

bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, mefentrifluconazole, metconazole, myclobutanil, penconazole, propiconazole, prothioconazole, simeconazole, tebuconazole, tetraconazole, triadimefon, triadimenol, triticonazole z) Triazolopyrimidine compounds 5-(methoxymethyl)-6-octyl[1,2,4]triazolo[1,5-a]pyrimidine-7-amine, 5-chloro-7-(4-methylpiperidine-1-yl)-6-(2,4,6-trifluorophenyl)[1,2,4]triazolo[1,5-a]pyrimidine, 5-chloro-N-[(1R)-1,2-dimethylpropyl]-6-(2,4,6-trifluorophenyl)[1,2,4]triazolo[1,5-a]pyrimidine, 5-chloro-N-[(1S)-2,2,2-trifluoro-1-methylethyl]-6-(2,4,6-trifluorophenyl)[1,2,4]triazolo[1,5-a]pyrimidine,
5-ethyl-6-octyl[1,2,4]triazolo[1,5-a]pyrimidine-7-amine,
ametoctradin aa) Valinamide compounds:
benthiavalicarb-isopropyl, ipravalicarb, valifenalate.

More preferably, following one or more compounds can be used for a combination treatment and applied simultaneously, prior or post treatment with silthiofam:

a) benzimidazoles selected from benomyl, carbendazim, fuberidazole, thiabendazole, thiophanate, thiophanate-methyl
b) carboxamides selected from bixafen, boscalid, carboxin, carpropamid, cyflufenamid, diclocymet, ethaboxam, fenhexamid, fenoxanil, flumetover, fluopicolide, fluopyram, flutolanil, furametpyr, isopyrazam, isotianil, mandipropamid, mepronil, oxycarboxin, penflufen, penthiopyrad, picobenzamide, sedaxane, tecloftalam, thifluzamide, tiadinil, tolfenpyrad, zoxamide
c) copper compounds selected from basic copper chloride, basic copper sulfate, copper, copper (nonylphenyl) sulphonate, cupric hydroxide, cupric sulphate pentahydrate, cupric sulphate(anhydrous), DBEDC, dodecylbenzenesulphonic acid bisethylenediamine copper(II) complex, oxine copper
d) dithiocarbamates selected from mancozeb, maneb, manzeb, metiram, polycarbamate, propineb, thiuram, zineb, ziram
e) organochlorine selected from chlorothalonil, fthalide, quintozene
f) pyrimidines selected from bupirimate, cyprodinil, diflumetorim, dimethirimol, fenarimol, ferimzone, mepanipyrim, nuarimol, pyrimethanil
g) pyrrole compounds selected from fenpiclonil, fludioxonil, fluoroimide
h) strobilurins selected from azoxystrobin, dimoxystrobin, fluoxastrobin, kresoxim-methyl, metominostrobin, orysastrobin, picoxystrobin, pyraclostrobin, pyrametostrobin, pyraoxystrobin, trifloxystrobin
i) triazole compounds selected from bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, mefentrifluconazole, metconazole, myclobutanil, penconazole, propiconazole, prothioconazole, simeconazole, tebuconazole, tetraconazole, triadimefon, triadimenol, triticonazole Other objects, features and advantages of the present invention will become apparent from the following description and examples.

For the purpose of the present disclosure, the following terms have the following meanings:

As used herein, and unless otherwise indicated, the term 'about' when used in connection with numeric values or numerical ranges such as amounts, weight ratios, weight percentages, or application rates of ingredients of a composition, means an amount, a weight ratio, a weight percentage, or an application rate that is recognized by those of ordinary skill in the art to provide an desired effect equivalent to that obtained from the specified amount, weight ratio, weight percentage, or application rate is encompassed.

Specifically, the term 'about' contemplates an amount, a weight ratio, or an application rate within ±30%, ±25%, ±20%, ±15%, ±10%, or ±5% of the specified numerical value or range in question.

In the tables presented below, the following terms have the following meaning:

| | |
|---|---|
| 0.0% | disease progressed to maximum (no efficacy) |
| 100.0% | no disease symptoms observed |
| lealow | lower canopy leaves |
| leamid | middle canopy leaves |
| leaupp | upper canopy leaves |

EXAMPLES

Example 1: Pot Trial

Glasshouse pot trials were conducted to evaluate the effect and efficacy of silthiofam on soybean rust disease on soybean (*Glycine max*).

The trial was divided in 11 treatments. In 4 of the treatments, silthiofam was applied in different amounts.

Silthiofam compositions used in this trial were prepared from the suspension concentrate containing 125 g/L of silthiofam, diluted with water to predetermined concentration and sprayed on the plants in the predetermined amounts.

In two of the treatments, silthiofam was applied in combination with additional ingredients.

First combination was of silthiofam and chitosan, wherein silthiofam was applied in an amount of 250 g/ha on the plant first and chitosan was applied subsequently in an amount of 200 g/ha.

Second combination was a combination of silthiofam and tagatose, wherein silthiofam was applied in an amount of 250 g/ha simultaneously with tagatose in an amount of 200 g/ha.

Further 6 treatments were current market available treatments of soybean rust applied in the label prescribed dose, wherein the compositions used were prepared from commercially available products prepared according to the respective label instructions and sprayed on the plants.

One treatment of the trial consisted of fungi inoculated plants which received no treatment.

Soybean plants were treated two times with silthiofam and other treatments. First treatment was applied when soybean plants reached stage BBCH16 and the second treatment was applied when soybean plants reached stage BBCH61. Growth stages were defined according to *Compendium of Growth Stage Identification Keys for Mono- and Dicotyledonous Plants, Extended BBCH scale,* 2*nd Edition* 1997, ISBN 3-9520749-3-4.

After silthiofam and other treatments were applied first time, plants were inoculated with *Phakopsora pachyrhizi* spores and evaluation of leaves condition and disease spread was done every 7 days.

Method used for evaluation of disease spread was visual estimation of degree of infection on leaves.

The experimental design of the pot trial was randomized design with 4 pot replications per treatment applied, wherein six soybean plants were planted per pot. All pots were randomly mixed and placed in the glasshouse, so the results of the different treatments would be comparable, and influence of the climatic condition would be downsized to the minimum.

Treatments were the following:

Treatment 1: Plant inoculated with *P. pachyrhizi*, no treatment applied

Treatment 2: Treatment with flutriafol and azoxystrobin mixture, applied in concentration of 31.25 g flutriafol/ha and 37.5 g azoxystrobin/ha Treatment 3: Silthiofam treatment applied in 250 g silthiofam/ha Treatment 4: Silthiofam treatment applied in 500 g silthiofam/ha Treatment 5: Silthiofam treatment applied in 250 g silthiofam/ha and 200 g/ha of tagatose Treatment 6: Silthiofam treatment applied in 250 g silthiofam/ha and 200 g/ha of chitosan Treatment 7: Mancozeb applied in 1.68 kg mancozeb/ha Treatment 8: Chlorothalonil applied in 626.4 g chlorothalonil/ha Treatment 9: Azoxystrobin applied in 37.5 g azoxystrobin/ha Treatment 10: Boscalid applied in 294 g boscalid/ha Treatment 11: Prothioconazole and tebuconazole mixture applied as 42 g prothioconazole/ha and 84 g tebuconazole/ha Results of the conducted pot trial are shown in Table 1.

TABLE 1

Pot trial: % efficacy

| | | Days After First/Last Application | | | | | | | | |
|---|---|---|---|---|---|---|---|---|---|---|
| | | 7/7 | | | 14/14 Plant-Evaluation Interval (days) | | | 21/21 | | |
| | | 19 after planting | | | 26 after planting Part rated | | | 33 after planting | | |
| Formulation | Rating unit | LEALOW | LEAMID | LEAUPP | LEALOW | LEAMID % | LEAUPP | LEALOW | LEAMID | LEAUPP |
| UTC - | | 0.0 | 0.0 | 0.0 | 0.0 | 0.0 | 0.0 | 0.0 | 0.0 | 0.0 |
| Inoculated | | 0.0 | 0.0 | 0.0 | 0.0 | 0.0 | 0.0 | 0.0 | 0.0 | 0.0 |
| | | 0.0 | 0.0 | 0.0 | 0.0 | 0.0 | 0.0 | 0.0 | 0.0 | 0.0 |
| | | 0.0 | 0.0 | 0.0 | 0.0 | 0.0 | 0.0 | 0.0 | 0.0 | 0.0 |
| Flutriafol | 31.25 g/ha | 71.4 | 93.4 | 100.0 | 82.0 | 95.0 | 100.0 | 58.0 | 92.0 | 98.4 |
| Azoxystrobin | 37.5 g/ha | 77.3 | 100.0 | 100.0 | 78.0 | 87.9 | 100.0 | 49.0 | 85.0 | 100.0 |
| | | 83.9 | 90.9 | 100.0 | 88.3 | 96.0 | 100.0 | 45.0 | 90.0 | 98.7 |
| | | 77.8 | 100.0 | 100.0 | 84.7 | 90.5 | 100.0 | 38.0 | 86.0 | 98.6 |
| Silthiofam | 250 g/ha | 71.5 | 93.4 | 100.0 | 89.0 | 95.0 | 100.0 | 78.0 | 92.0 | 100.0 |
| | | 90.9 | 100.0 | 100.0 | 82.0 | 91.2 | 100.0 | 76.0 | 89.0 | 100.0 |
| | | 93.6 | 81.9 | 100.0 | 84.7 | 92.0 | 100.0 | 82.0 | 90.0 | 100.0 |
| | | 88.9 | 85.0 | 100.0 | 84.1 | 89.4 | 100.0 | 80.0 | 88.0 | 100.0 |
| Silthiofam | 500 g/ha | 85.8 | 93.4 | 100.0 | 92.0 | 99.0 | 100.0 | 89.0 | 96.0 | 100.0 |
| | | 95.5 | 94.5 | 100.0 | 90.0 | 96.8 | 100.0 | 86.0 | 95.0 | 100.0 |
| | | 93.6 | 100.0 | 100.0 | 94.7 | 99.0 | 100.0 | 92.0 | 97.0 | 100.0 |
| | | 97.3 | 100.0 | 100.0 | 91.9 | 97.9 | 100.0 | 89.0 | 96.0 | 100.0 |
| Silthiofam | 250 g/ha | 100.0 | 100.0 | 100.0 | 95.0 | 100.0 | 100.0 | 92.0 | 100.0 | 100.0 |
| Tagatose | 200 g/ha | 100.0 | 100.0 | 100.0 | 96.0 | 98.9 | 100.0 | 94.0 | 99.0 | 100.0 |
| | | 100.0 | 100.0 | 100.0 | 96.8 | 100.0 | 100.0 | 95.0 | 99.0 | 100.0 |
| | | 100.0 | 100.0 | 100.0 | 95.9 | 100.0 | 100.0 | 94.0 | 99.0 | 100.0 |
| Silthiofam | 250 g/ha | 100.0 | 100.0 | 100.0 | 95.0 | 100.0 | 100.0 | 90.0 | 100.0 | 100.0 |
| Chitosan | 200 g/ha | 100.0 | 100.0 | 100.0 | 92.0 | 100.0 | 100.0 | 90.0 | 99.0 | 100.0 |
| | | 100.0 | 100.0 | 100.0 | 97.0 | 99.0 | 100.0 | 95.0 | 100.0 | 100.0 |
| | | 100.0 | 100.0 | 100.0 | 97.0 | 98.9 | 100.0 | 94.0 | 99.0 | 100.0 |
| Mancozeb | 1.68 kg/ha | 50.0 | 46.7 | 100.0 | 67.0 | 82.0 | 83.8 | 42.0 | 66.0 | 71.0 |
| | | 65.9 | 72.3 | 100.0 | 75.0 | 78.0 | 72.3 | 38.0 | 62.0 | 72.3 |
| | | 64.6 | 54.6 | 100.0 | 56.4 | 78.0 | 85.9 | 52.0 | 59.0 | 66.7 |
| | | 61.2 | 50.0 | 100.0 | 64.3 | 73.5 | 76.0 | 48.0 | 60.0 | 60.0 |
| Chlorothalonil | 626.4 g/ha | 35.8 | 46.7 | 100.0 | 75.0 | 85.0 | 88.3 | 55.0 | 72.0 | 82.3 |
| | | 65.9 | 44.5 | 100.0 | 69.0 | 80.2 | 81.5 | 40.0 | 70.0 | 80.6 |
| | | 54.9 | 0.0 | 100.0 | 68.1 | 79.0 | 78.9 | 44.0 | 65.0 | 72.0 |
| | | 50.0 | 25.0 | 100.0 | 59.2 | 67.1 | 80.0 | 45.0 | 62.0 | 64.3 |
| Azoxystrobin | 37.5 g/ha | 64.3 | 73.4 | 100.0 | 85.0 | 92.0 | 98.6 | 72.0 | 82.0 | 100.0 |
| | | 72.8 | 88.9 | 100.0 | 79.0 | 94.5 | 90.8 | 65.0 | 79.0 | 100.0 |
| | | 67.8 | 81.9 | 100.0 | 84.1 | 90.0 | 98.6 | 59.0 | 90.0 | 100.0 |
| | | 77.8 | 100.0 | 100.0 | 80.6 | 89.4 | 98.7 | 60.0 | 78.0 | 100.0 |
| Boscalid | 294 g/ha | 85.8 | 100.0 | 100.0 | 76.0 | 90.0 | 98.6 | 55.0 | 56.0 | 91.9 |
| | | 86.4 | 100.0 | 100.0 | 80.0 | 86.8 | 92.6 | 42.0 | 49.0 | 88.9 |
| | | 93.6 | 100.0 | 100.0 | 78.0 | 88.0 | 98.6 | 38.0 | 55.0 | 89.4 |
| | | 100.0 | 100.0 | 100.0 | 76.0 | 85.1 | 98.7 | 35.0 | 52.0 | 92.9 |

TABLE 1-continued

| | | | | | | | | | | |
|---|---|---|---|---|---|---|---|---|---|---|
| | | Pot trial: % efficacy | | | | | | | | |
| Prothioconazole | 42 g/ha | 71.5 | 100.0 | 100.0 | 87.3 | 99.0 | 100.0 | 79.0 | 90.0 | 100.0 |
| Tebuconazole | 84 g/ha | 88.7 | 100.0 | 100.0 | 85.8 | 100.0 | 100.0 | 82.0 | 92.0 | 100.0 |
| | | 83.9 | 100.0 | 100.0 | 90.0 | 100.0 | 100.0 | 76.0 | 92.0 | 100.0 |
| | | 91.7 | 100.0 | 100.0 | 85.0 | 98.9 | 100.0 | 75.0 | 89.0 | 100.0 |
| | | Days After First/Last Application | | | | | | | | |
| | | 28/7 | | | 35/14 Plant-Evaluation Interval (days) | | | 42/21 | | |
| | | 40 after planting | | | 47 after planting Part rated | | | 54 after planting | | |
| Formulation | Rating unit | LEALOW | LEAMID | LEAUPP | LEALOW | LEAMID % | LEAUPP | LEALOW | LEAMID | LEAUPP |
| UTC - | | 0.0 | 0.0 | 0.0 | — | 0.0 | 0.0 | — | 0.0 | 0.0 |
| Inoculated | | 0.0 | 0.0 | 0.0 | — | 0.0 | 0.0 | — | 0.0 | 0.0 |
| | | 0.0 | 0.0 | 0.0 | — | 0.0 | 0.0 | — | 0.0 | 0.0 |
| | | 0.0 | 0.0 | 0.0 | — | 0.0 | 0.0 | — | 0.0 | 0.0 |
| Flutriafol | 31.25 g/ha | 32.0 | 76.0 | 100.0 | — | 82.0 | 98.9 | — | 65.0 | 95.0 |
| Azoxystrobin | 37.5 g/ha | 38.0 | 82.0 | 100.0 | — | 78.0 | 100.0 | — | 62.0 | 92.0 |
| | | 35.0 | 78.0 | 100.0 | — | 82.0 | 98.9 | — | 73.0 | 94.0 |
| | | 32.0 | 75.0 | 100.0 | — | 74.0 | 100.0 | — | 59.0 | 96.0 |
| Silthiofam | 250 g/ha | 82.0 | 92.0 | 100.0 | — | 78.0 | 94.5 | — | 48.0 | 86.0 |
| | | 80.0 | 88.0 | 100.0 | — | 82.0 | 98.0 | — | 54.0 | 85.0 |
| | | 84.0 | 88.0 | 100.0 | — | 80.0 | 95.5 | — | 59.0 | 89.0 |
| | | 80.0 | 90.0 | 100.0 | — | 84.0 | 92.9 | — | 52.0 | 86.0 |
| Silthiofam | 500 g/ha | 88.0 | 95.0 | 100.0 | — | 92.0 | 98.9 | — | 79.0 | 92.0 |
| | | 90.0 | 93.0 | 100.0 | — | 89.0 | 100.0 | — | 72.0 | 90.0 |
| | | 90.0 | 93.0 | 100.0 | — | 90.0 | 90.9 | — | 80.0 | 95.0 |
| | | 85.0 | 92.0 | 100.0 | — | 86.0 | 100.0 | — | 82.0 | 93.0 |
| Silthiofam | 250 g/ha | 90.0 | 98.0 | 100.0 | — | 90.0 | 94.5 | — | 85.0 | 88.0 |
| Tagatose | 200 g/ha | 92.0 | 97.0 | 100.0 | — | 88.0 | 95.0 | — | 78.0 | 85.0 |
| | | 90.0 | 97.0 | 100.0 | — | 92.0 | 92.0 | — | 82.0 | 89.0 |
| | | 90.0 | 98.0 | 100.0 | — | 92.0 | 95.3 | — | 76.0 | 87.0 |
| Silthiofam | 250 g/ha | 86.5 | 98.0 | 100.0 | — | 95.0 | 100.0 | — | 85.0 | 92.0 |
| Chitosan | 200 g/ha | 85.0 | 99.0 | 100.0 | — | 98.0 | 99.0 | — | 78.0 | 95.0 |
| | | 90.0 | 99.0 | 100.0 | — | 92.0 | 100.0 | — | 76.0 | 90.0 |
| | | 88.0 | 98.0 | 100.0 | — | 95.0 | 100.0 | — | 80.0 | 92.0 |
| Mancozeb | 1.68 kg/ha | 28.0 | 62.0 | 82.1 | — | 48.0 | 72.6 | — | 0.0 | 54.0 |
| | | 35.0 | 56.0 | 74.2 | — | 36.0 | 67.0 | — | 15.0 | 43.0 |
| | | 32.0 | 54.0 | 73.7 | — | 32.0 | 59.0 | — | 12.0 | 52.0 |
| | | 25.0 | 49.0 | 68.9 | — | 43.0 | 54.8 | — | 5.0 | 38.0 |
| Chlorothalonil | 626.4 g/ha | 22.0 | 56.0 | 74.4 | — | 52.0 | 63.8 | — | 15.0 | 52.0 |
| | | 34.0 | 52.0 | 70.6 | — | 44.0 | 69.0 | — | 25.0 | 45.0 |
| | | 32.0 | 55.0 | 70.9 | — | 48.0 | 68.0 | — | 5.0 | 42.0 |
| | | 26.0 | 54.0 | 76.7 | — | 42.0 | 69.0 | — | 12.0 | 48.0 |
| Azoxystrobin | 37.5 g/ha | 67.0 | 85.0 | 100.0 | — | 88.0 | 100.0 | — | 62.0 | 85.0 |
| | | 65.0 | 88.0 | 100.0 | — | 82.0 | 100.0 | — | 56.0 | 82.0 |
| | | 62.0 | 82.0 | 100.0 | — | 85.0 | 98.9 | — | 58.0 | 86.0 |
| | | 54.0 | 82.0 | 100.0 | — | 85.0 | 100.0 | — | 52.0 | 82.0 |
| Boscalid | 294 g/ha | 49.0 | 44.0 | 85.9 | — | 35.0 | 83.6 | — | 12.0 | 75.0 |
| | | 52.0 | 48.0 | 100.0 | — | 42.0 | 82.0 | — | 4.0 | 67.0 |
| | | 51.0 | 56.0 | 93.1 | — | 48.0 | 77.3 | — | 0.0 | 64.0 |
| | | 44.0 | 52.0 | 85.7 | — | 43.0 | 82.2 | — | 15.0 | 72.0 |
| Prothioconazole | 42 g/ha | 82.0 | 92.0 | 100.0 | — | 89.0 | 100.0 | — | 69.0 | 98.0 |
| Tebuconazole | 84 g/ha | 75.0 | 95.0 | 100.0 | — | 92.0 | 100.0 | — | 74.0 | 95.0 |
| | | 80.0 | 92.0 | 100.0 | — | 88.0 | 100.0 | — | 72.0 | 96.0 |
| | | 80.0 | 90.0 | 100.0 | — | 86.0 | 100.0 | — | 76.0 | 97.0 |

Example 2: Field Trial

Field trial was conducted to evaluate the effect and efficacy of silthiofam on soybean rust disease on soybean (*Glycine max*) wherein plants were naturally infected by the disease.

The trial was divided in the following 8 treatments:

one treatment where plants were left untreated and in which natural progression of the disease can be observed;

one reference treatment which consisted of combination of azoxystrobin and flutriafol which are currently available treatments of soybean rust and which were applied in the dose as shown in Table 2, wherein the compositions used were prepared from commercially available products prepared according to the respective label instructions and sprayed on the plants;

two treatments with silthiofam alone in different dosage amounts;

and four treatments where silthiofam was applied with other compounds, namely tagatose and chitosan in different dosage ratios.

Each treatment was applied on a plot of 6 ft*30 ft in size and was repeated in 4 replicates.

Silthiofam compositions used in this trial were prepared from the suspension concentrate containing 125 g/L of silthiofam, diluted with water to predetermined concentration and sprayed on the plants in the predetermined amounts.

For each treatment, two applications of respective treatment were made with 19 days interval between. First application was made when soybean plant reached stage BBCH 64, and the second one when plant reached stage BBCH 73. Growth stages were defined according to *Compendium of Growth Stage Identification Keys for Mono- and Dicotyledonous Plants, Extended BBCH scale, 2nd Edition* 1997, ISBN 3-9520749-3-4.

Method used for evaluation of disease spread was visual estimation of degree of infection on leaves.

Obtained data and results are shown in Table 2.

TABLE 2

Field trial (% efficacy)

| | | Days After First/Last Application | | | | | |
|---|---|---|---|---|---|---|---|
| | | 14/14 | | | 20/1 | | |
| | | Part rated | | | | | |
| | | LEALOW | LEAMID | LEAUPP | LEALOW | LEAMID | LEAUPP |
| Formulation | Rating unit | % | | | | | |
| UTC - | | 0.0 | 0.0 | 0.0 | 0.0 | 0.0 | 0.0 |
| Inoculated | | 0.0 | 0.0 | 0.0 | 0.0 | 0.0 | 0.0 |
| | | 0.0 | 0.0 | 0.0 | 0.0 | 0.0 | 0.0 |
| | | 0.0 | 0.0 | 0.0 | 0.0 | 0.0 | 0.0 |
| Flutriafol | 31.25 g/ha | 88.9 | 100.0 | 0.0 | 83.0 | 97.9 | 100.0 |
| Azoxystrobin | 37.5 g/ha | 96.1 | 100.0 | 0.0 | 73.3 | 100.0 | 100.0 |
| | | 87.8 | 100.0 | 0.0 | 85.9 | 98.0 | 100.0 |
| | | 90.9 | 100.0 | 0.0 | 82.7 | 97.9 | 100.0 |
| Silthiofam | 125 g/ha | 88.9 | 95.5 | 0.0 | 68.2 | 83.3 | 90.9 |
| | | 84.3 | 92.9 | 0.0 | 56.0 | 78.2 | 88.9 |
| | | 63.4 | 95.0 | 0.0 | 64.1 | 80.4 | 100.0 |
| | | 77.3 | 90.9 | 0.0 | 69.1 | 83.3 | 94.4 |
| Silthiofam | 250 g/ha | 66.7 | 81.8 | 0.0 | 60.2 | 68.8 | 81.8 |
| | | 56.9 | 78.6 | 0.0 | 45.3 | 67.3 | 83.3 |
| | | 73.2 | 70.0 | 0.0 | 57.7 | 78.4 | 90.0 |
| | | 59.1 | 63.6 | 0.0 | 65.4 | 68.8 | 100.0 |
| Silthiofam | 250 g/ha | 91.1 | 100.0 | 0.0 | 79.5 | 89.6 | 100.0 |
| Tagatose | 150 g/ha | 90.2 | 100.0 | 0.0 | 70.7 | 85.5 | 100.0 |
| | | 92.7 | 100.0 | 0.0 | 80.8 | 96.1 | 100.0 |
| | | 88.6 | 100.0 | 0.0 | 77.8 | 89.6 | 100.0 |
| Silthiofam | 125 g/ha | 82.2 | 95.5 | 0.0 | 75.0 | 83.3 | 90.9 |
| Tagatose | 150 g/ha | 90.2 | 100.0 | 0.0 | 80.0 | 80.0 | 83.3 |
| | | 80.5 | 100.0 | 0.0 | 76.9 | 84.3 | 90.0 |
| | | 68.2 | 86.4 | 0.0 | 70.4 | 72.9 | 88.9 |
| Silthiofam | 250 g/ha | 88.9 | 100.0 | 0.0 | 90.9 | 77.1 | 90.9 |
| Chitosan | 200 g/ha | 84.3 | 96.4 | 0.0 | 80.0 | 72.7 | 88.9 |
| | | 90.2 | 100.0 | 0.0 | 76.9 | 80.4 | 100.0 |
| | | 90.9 | 100.0 | 0.0 | 85.2 | 79.2 | 94.4 |
| Silthiofam | 125 g/ha | 82.2 | 90.9 | 0.0 | 71.6 | 68.8 | 72.7 |
| Chitosan | 200 g/ha | 80.4 | 85.7 | 0.0 | 70.7 | 80.0 | 94.4 |
| | | 85.4 | 95.0 | 0.0 | 64.1 | 70.6 | 80.0 |
| | | 81.8 | 95.5 | 0.0 | 69.1 | 70.8 | 88.9 |

| | | Days After First/Last Application | | | | | |
|---|---|---|---|---|---|---|---|
| | | 27/8 | | | 34/15 | | |
| | | Part rated | | | | | |
| | | LEALOW | LEAMID | LEAUPP | LEALOW | LEAMID | LEAUPP |
| Formulation | Rating unit | % | | | | | |
| UTC - | | 0.0 | 0.0 | 0.0 | — | 0.0 | 0.0 |
| Inoculated | | 0.0 | 0.0 | 0.0 | — | 0.0 | 0.0 |
| | | 0.0 | 0.0 | 0.0 | — | 0.0 | 0.0 |
| | | 0.0 | 0.0 | 0.0 | — | 0.0 | 0.0 |
| Flutriafol | 31.25 g/ha | 82.0 | 92.6 | 96.4 | 75.0 | 82.0 | 90.9 |
| Azoxystrobin | 37.5 g/ha | 75.0 | 97.2 | 100.0 | 64.0 | 89.0 | 96.6 |
| | | 85.0 | 92.9 | 96.7 | 74.0 | 87.0 | 90.9 |
| | | 82.0 | 95.5 | 100.0 | 72.0 | 83.0 | 92.2 |
| Silthiofam | 125 g/ha | 35.00 | 77.9 | 89.3 | 45.0 | 72.0 | 90.9 |
| | | 42.00 | 75.0 | 85.7 | 35.0 | 67.0 | 86.2 |
| | | 36.00 | 78.6 | 93.3 | 52.0 | 72.0 | 90.9 |
| | | 35.00 | 80.3 | 95.2 | 55.0 | 72.7 | 92.2 |
| Silthiofam | 250 g/ha | 55.00 | 61.8 | 82.1 | 25.0 | 62.0 | 67.3 |
| | | 65.00 | 61.1 | 77.1 | 22.0 | 58.0 | 62.1 |
| | | 58.00 | 68.6 | 83.3 | 30.0 | 62.0 | 54.5 |
| | | 48.00 | 62.1 | 88.1 | 35.0 | 56.8 | 57.8 |
| Silthiofam | 250 g/ha | 22.00 | 88.2 | 96.4 | 65.0 | 85.0 | 85.5 |
| Tagatose | 150 g/ha | 28.00 | 81.9 | 94.3 | 58.0 | 82.0 | 91.4 |
| | | 20.00 | 88.6 | 96.7 | 65.0 | 75.0 | 80.0 |
| | | 25.00 | 87.9 | 97.6 | 64.0 | 77.3 | 79.7 |

TABLE 2-continued

| Field trial (% efficacy) | | | | | | | | |
|---|---|---|---|---|---|---|---|---|
| Silthiofam | 125 g/ha | 35.00 | 77.9 | 82.1 | 52.0 | 72.0 | 74.5 |
| Tagatose | 150 g/ha | 25.00 | 75.0 | 85.7 | 56.0 | 65.0 | 74.1 |
| | | 28.00 | 78.6 | 90.0 | 55.0 | 70.0 | 80.0 |
| | | 33.00 | 72.7 | 88.1 | 52.0 | 62.5 | 65.6 |
| Silthiofam | 250 g/ha | 15.00 | 77.9 | 89.3 | 65.0 | 78.0 | 85.5 |
| Chitosan | 200 g/ha | 23.00 | 72.2 | 85.7 | 62.0 | 72.0 | 91.4 |
| | | 25.00 | 78.6 | 93.3 | 62.0 | 75.0 | 90.9 |
| | | 18.00 | 77.3 | 92.9 | 72.0 | 73.9 | 95.3 |
| Silthiofam | 125 g/ha | 33.00 | 61.8 | 82.1 | 55.0 | 62.0 | 80.0 |
| Chitosan | 200 g/ha | 28.00 | 72.2 | 85.7 | 52.0 | 65.0 | 74.1 |
| | | 36.00 | 60.0 | 73.3 | 49.0 | 62.0 | 67.3 |
| | | 38.00 | 62.1 | 88.1 | 50.0 | 59.1 | 71.9 |

TABLE 3

| Harvest data (field trial) | | |
|---|---|---|
| Formulation | | Yield % |
| UTC - | | 100.00 |
| Inoculated | | 100.00 |
| | | 100.00 |
| | | 100.00 |
| Flutriafol | 31.25 g/ha | 734.78 |
| Azoxystrobin | 37.5 g/ha | 411.11 |
| | | 790.91 |
| | | 452.78 |
| Silthiofam | 125 g/ha | 678.26 |
| | | 273.33 |
| | | 672.73 |
| | | 377.78 |
| Silthiofam | 250 g/ha | 530.43 |
| | | 253.33 |
| | | 618.18 |
| | | 300.00 |
| Silthiofam | 250 g/ha | 686.96 |
| Tagatose | 150 g/ha | 368.89 |
| | | 645.45 |
| | | 436.11 |
| Silthiofam | 125 g/ha | 530.43 |
| Tagatose | 150 g/ha | 295.56 |
| | | 477.27 |
| | | 344.44 |
| Silthiofam | 250 g/ha | 673.91 |
| Chitosan | 200 g/ha | 326.67 |
| | | 754.55 |
| | | 397.22 |
| Silthiofam | 125 g/ha | 513.04 |
| Chitosan | 200 g/ha | 211.11 |
| | | 604.55 |
| | | 308.33 |

At the end of the trial, all plots were harvested, and the yield per treatment applied was compared to the yield of the untreated control.

The yield of the untreated control (UTC) has been set as 100% and the yield per treatment is calculated relatively to the UTC. Values above 100% show an evident benefit of using silthiofam for controlling and treating of plants infected with soybean rust disease.

What is claimed is:

1. A method for controlling, preventing and/or treating phytopathogenic fungi causing soybean rust infections consisting of spraying or dusting seeds, soil, or plants in need thereof with a fungicidally effective amount of silthiofam.

2. The method according to claim 1, wherein the phytopathogenic fungi is selected from the group consisting of *Phakopsora pachyrhizi* and *P. meibomiae.*

3. The method according to claim 1, wherein the plant is a legume plant.

4. The method according to claim 3, wherein the legume plant is selected from the group consisting of soybean, bean, kudzu and pea.

5. The method according to claim 1, wherein the silthiofam is applied as a foliar treatment.

6. The method according to claim 1, wherein the silthiofam is applied in an amount of about 10 g/ha to about 2000 g/ha.

7. The method according to claim 1, wherein the silthiofam is applied in an amount of about 100 g/ha to about 1000 g/ha.

8. The method according to claim 1, wherein the silthiofam is applied in an amount of about 100 g/ha to about 500 g/ha.

9. The method according to claim 1, wherein the silthiofam is applied in an amount of about 125 g/ha, about 250 g/ha and/or about 500 g/ha.

* * * * *